United States Patent
Harel et al.

(10) Patent No.: US 8,325,733 B2
(45) Date of Patent: Dec. 4, 2012

(54) METHOD AND SYSTEM FOR LAYER 2 MANIPULATOR AND FORWARDER

(75) Inventors: Amir Harel, Ein-Vered (IL); Alon Lelcuk, Ramot-Meir (IL); Ronit Nossenson, Kfar-Sava (IL); Avinoam Zakai, Sharona (IL)

(73) Assignee: Exafer Ltd, Ein-Vered (IL)

( * ) Notice: Subject to any disclaimer, the term of this patent is extended or adjusted under 35 U.S.C. 154(b) by 214 days.

(21) Appl. No.: 12/876,910

(22) Filed: Sep. 7, 2010

(65) Prior Publication Data

US 2011/0058549 A1 Mar. 10, 2011

Related U.S. Application Data

(60) Provisional application No. 61/240,855, filed on Sep. 9, 2009.

(51) Int. Cl.
*H04L 12/28* (2006.01)
*H04L 12/56* (2006.01)
*H04L 1/00* (2006.01)
*H04L 12/26* (2006.01)

(52) U.S. Cl. .................. 370/395.3; 370/230.1; 370/231; 370/236

(58) Field of Classification Search .......... 370/229–231, 370/235, 236, 389, 392, 395.3
See application file for complete search history.

(56) References Cited

U.S. PATENT DOCUMENTS

| | | |
|---|---|---|
| 4,597,078 A | 6/1986 | Kempf |
| 5,214,646 A | 5/1993 | Yacoby |
| 5,249,292 A | 9/1993 | Chiappa |
| 5,274,631 A | 12/1993 | Bhardwaj |
| 5,319,644 A | 6/1994 | Liang |
| 5,477,541 A | 12/1995 | White et al. |
| 5,600,644 A | 2/1997 | Chang et al. |
| 5,602,851 A | 2/1997 | Terashita et al. |
| 5,608,726 A | 3/1997 | Virgile |
| 5,633,865 A | 5/1997 | Short |
| 5,633,866 A | 5/1997 | Callon |
| 5,740,171 A | 4/1998 | Mazzola et al. |
| 5,790,546 A | 8/1998 | Dobbins et al. |
| 5,892,924 A | 4/1999 | Lyon et al. |
| 5,909,441 A | 6/1999 | Alexander, Jr. et al. |
| 5,910,954 A | 6/1999 | Bronstein et al. |
| 6,006,264 A | 12/1999 | Colby et al. |

(Continued)

OTHER PUBLICATIONS

Haito Wu, Yunxin Liu, Qian Zhang, and Zhi-Li Shang, SoftMAC: Layer 2.5 Collaborative MAC for Multimedia Support in Multihop Wireless Networks, IEEE Transactions on Mobile Computing, Jan. 2007, pp. 12, vol. 6, No. 1.

*Primary Examiner* — Ronald Abelson
(74) *Attorney, Agent, or Firm* — Smith Risley Tempel Santos LLC; Gregory Scott Smith (57) ABSTRACT

The disclosure describes method and system for forwarding frames of a flow via a layer 2 forwarder and manipulator (L2FM) for improving network utilization and improving users experience by reducing the latency associated with the flow. When a new flow is identified, forward control information for frames of the new flow is obtained. The forward control information can include re-writing of at least one field in an original header of the frames of the new flow. At least one field in an original header of the frames of the new flow is manipulated according to the obtained forward control information, and the manipulated frames of the new flow are forwarded accordingly.

42 Claims, 7 Drawing Sheets

U.S. PATENT DOCUMENTS

| | | | |
|---|---|---|---|
| 6,061,334 A | 5/2000 | Berlovitch et al. | |
| 6,067,298 A * | 5/2000 | Shinohara | 370/395.71 |
| 6,088,356 A | 7/2000 | Hendel et al. | |
| 6,147,993 A | 11/2000 | Kloth et al. | |
| 6,243,667 B1 | 6/2001 | Kerr et al. | |
| 6,424,659 B2 | 7/2002 | Viswanadham et al. | |
| 6,639,901 B1 | 10/2003 | Katzri et al. | |
| 6,674,769 B1 | 1/2004 | Viswanath | |
| 6,717,949 B1 | 4/2004 | Boden et al. | |
| 6,792,471 B2 | 9/2004 | Nomura et al. | |
| 6,853,638 B2 | 2/2005 | Cohen | |
| 6,944,130 B1 | 9/2005 | Chu et al. | |
| 7,197,550 B2 | 3/2007 | Cheline et al. | |
| 7,197,556 B1 | 3/2007 | Short et al. | |
| 7,325,071 B2 | 1/2008 | Krishnan | |
| 2003/0058872 A1 * | 3/2003 | Berggreen et al. | 370/401 |
| 2007/0206565 A1 * | 9/2007 | Evans | 370/352 |
| 2010/0325280 A1 * | 12/2010 | Jindal et al. | 709/226 |

* cited by examiner

METHOD AND SYSTEM FOR LAYER 2 MANIPULATOR AND FORWARDER

CROSS-REFERENCE TO RELATED APPLICATIONS

This application is a non-provisional application being filed under 35 USC 111 and 37 CFR 1.53(b) and claiming the benefit under 35 USC 119(e) of the U.S. Provisional Application for Patent that was filed on Sep. 9, 2009 and assigned Ser. No. 61/240,855, which application is hereby incorporated by reference.

BACKGROUND

The present disclosure relates generally to data communication over a plurality of networks that comply with the Open System Interconnection (OSI) model. More particularly the disclosure relates to optimizing communication paths between a source and destination of a flow.

In networks, data is typically exchanged between communicating devices in the form of frames. A frame is a digital data transmission unit on the layer 2 of the Open System Interconnection (OSI) reference model, for example. It is used for data exchange between two points via a direct physical or logical link. The frame can include information on the communicating devices. Information such as, but not limited to: a source MAC (Media Access Control) address (SA), a destination MAC address (DA) in an Ethernet protocol frame. The frame can also include information on the specific connection defined between these two communicating devices: the Data Link Connection Identifier in the Frame Relay (FR) protocol, for example. Additional information on the communicating devices can reside in the headers of higher OSI layers such as, but not limited to: source and destination IP addresses in an Internet Protocol (IP) layer 3 protocol, source and destination ports in a layer 4 Transmission Control Protocol (TCP) protocol, etc.

In the present description, a flow is a sequence of frames associated with a single logical connection between communicating devices. A flow can be defined by a one-to-one relation between two communicating devices (uni-cast) or by a one-to-many relation, between one to two or more communicating devices (multi-cast and broadcast). A flow is identified for each data frame based on various headers' fields combinations. The headers' fields combination can be formed by selecting all fields or specific fields within the headers of the multiple layers protocols. An exemplary headers' fields combination for identifying a flow frame can be a source MAC address field and a destination MAC address field in the header of the layer 2 Ethernet protocol together with a source port field and a destination port field of the layer-4 TCP header. Another example of a flow can be associated with a specific TCP connection. In this case, the flow frames can be identified using the quartet of the fields: source IP address, destination IP address, source port and destination port, for example.

A session is a series of communications in the OSI application layer, initiated by a user or a device. A Point to Point Protocol (PPP) session is initiated when a user logs into the network with a user-id and a password, for example. A Dynamic Host Configuration Protocol (DHCP) session is initiated when a user device obtains an IP address from the network. A user may initiate multiple sessions on the same device. For example, a user may be using a computer that is downloading a Video on Demand movie in a first session and the user may also be browsing the WWW (World Wide Web) in a second session. Note that a session consists of one or more flows depending on the application. An HTTP browsing session to a particular web page consists of multiple TCP connections (multiple flows) downloading the page objects, for example. Real Time Streaming Protocol (RTSP) session may include several UDP flows that can originate from multiple servers is another example for a complex network session.

A layer 2 switch can use information in the layer 2 protocol headers to make traffic forwarding decisions. Such device is usually called a switch in Ethernet traffic. Using network topology information, smart switches can learn which ports have which end stations attached to it, by recording the Ethernet MAC addresses of the ingress packets. Using this information along with Layer 2 switches ability to use single dimension classification to parse the layer 2 headers of all frames and to classify the frames, enables smart layer 2 switches to forward frames out of the ports that it knows the end station is connected to. Frames with unknown destination MAC addresses, such as the case with frame destined to station addresses that have not yet been learned, are flooded out of every port in the switch forcing the recipient to reply. This allows the switch to learn the relevant MAC address, which is the source address on the reply frame. Many smart layer 2 switches offer the ability to configure smart services such as Quality of Service (QoS), bandwidth shaping, or Virtual Local Area Network (VLAN) membership based on the layer-2 information of the frames and the network topology.

Current type of smart switches such as, but not limited to Hammerhead Systems HSX 6000, or Alcatel-Lucent 7450 Ethernet Service Switch, can be remotely configured by an external management entities. However, there are no remotely controlled supporting admission mechanisms that are capable of communicating with a forwarding device for delivering control information on a per session basis or per flow basis. Meaning there is no method that verifies per each flow/session if the path chosen (forward information) is optimal.

A Deep Packet Inspection (DPI) Device such as but not limited to Cisco SCE or Allot NetEnforcer is an IP network equipment which is not an endpoint of a communication. DPI device has the ability to look at Layer 2 through Layer 7 of the OSI model, this includes headers and data protocol structures as well as the actual payload of the packets. DPI device identifies and classify the traffic based on a signature database that includes information extracted from the data part of a packet, allowing finer control than classification based only on header information. DPI devices can identify packet flows (rather than packet-by-packet analysis), allowing control actions based on accumulated flow/session information. DPI uses multi dimension classification are computational intensive, consume a lot of power and expensive while generally delivering more than an order magnitude slower throughput.

BRIEF SUMMARY

Therefore there is a need for a novel system and method that will control and manipulate forwarding rules and information of flows on a per session basis or per flow basis at intelligent switches. A need for a novel system and method that will check and verify per flow and/or per session basis if the control information can be optimized and change it accordingly at different novel intelligent switches along communication paths.

The above-described deficiencies, do not limit the scope of the inventive concepts of the present disclosure in any manner. The deficiencies are presented for illustration only.

The present disclosure provides a novel system and method that enables to dynamically control and manipulate layer-2 forwarding information and rules on per flow basis for specific flows or sessions at intelligent switches. The novel system and method comprise one or more intelligent switches along communication paths. The intelligent switches are capable of performing a low-OSI-layer inspection and accordingly identify and allocate a Remote admission and information controller (RAIC). Exemplary RAIC can be admission control servers such as but not limited to Radius and other AAA (authentication, authorization and accounting), application control servers such as but not limited to Peer-to-Peer applications, specific video streaming services, Web servers, etc. In addition to their common operation the different RAICs are adapted to communicate with the intelligent switches as well as to modify a relevant session in order to enable forwarding its frames toward an optimal path. The RAIC Remote admission and information controller can deliver information how to re-write headers of the flows at the intelligent switches according to a forwarding-rule-table associated to the intelligent switch. The forwarding-rule-table can be dynamically built, updated, and modified according to the different sessions and communication loads. The Session Description Protocol (SDP) or Web Services as in SOA (Service Oriented Architecture) as well as RADIUS and Diameter can be used, for example, for communication between the RAIC and the intelligent switches.

The novel system and method can yield many possibilities, advantages and benefits. Exemplary possibilities, advantages and benefits can be, but not limited to: Smart and efficient traffic forwarding without creation, administration and maintenance of complex polices, flexible per session forwarding decisions, traffic load reduction, traffic optimization, efficient solutions to security problems and flexible services and service set where the service logic is completely de-coupled from switch implementation while reducing the latency time and reducing the number of device which flows pass through in a path.

Furthermore, the novel system and method can optimize resource allocation and improve the resource and security management of an entire network. The novel system and method has an advanced control mechanism which enables the intelligent switches to "ask" control questions per session and/or flow basis in addition to enforcing traditional forwarding rules. Furthermore, per each flow the advanced control mechanism enables the intelligent switches to know where to find or request the control information.

Henceforth, the description, drawings and claims of the present disclosure may use the term layer 2 forwarder manipulator (L2FM) as a representative term for embodiments of the present disclosure intelligent switches. An exemplary embodiment of the present disclosure can operate in the following manner. First, one or more flows frames at the ingress of layer 2 forwarder manipulator (L2FM) are identified. If they are identified as new session flows then a request/search for forwarding control information begins. Next a flow-forwarding plan can be generated for each flow. The flow-forwarding plan can include a destination port or a virtual port, re-encapsulation instructions (not necessary according to the original encapsulation) and re-writing instructions of the original headers frames of the flow, etc. An original header is one of the headers that is associated with the frame at the host that created the frame, the source host. Headers such as but not limited to: layer 2 header (Ethernet header), IP header, etc. Finally, the flow-forwarding plan can be executed, and the L2FM can forward the flow frames properly.

Identifying a new flow and its associated frames can be quite complicated and might involve addresses discovery, protocol discovery, and/or tunneling encapsulation striping, for example.

After identifying the flow, a flow-forwarding plan can be generated. The flow forwarding rules can be defined according to the information received from one or more RAIC. The information can be static and known in advance; or it can be provided in-band in the frame headers, for example. Furthermore, the control information can be provided in an out-band manner. An exemplary embodiment of the present disclosure can comprise an authorized remote admission and information controller (RAIC). The RAIC can provide dynamic control information regarding the forward rules of flows. For example, the forwarding rules can include re-writing instructions and/or assignment of this traffic into a specific private network (e.g., VLAN) which its access can be controlled by the RAIC itself. Exemplary RAIC can comprise remote admission applications such as, but not limited to: Peer-to-Peer applications, specific video streaming services, and browsing services. The decision to forward data can be taken per flow. If necessary a unique control channel can be established to an RAIC, using Session Description Protocol (SDP) format, for example. The flow forwarding rules can be saved in a flow-forwarding table, for example.

Once the forwarding information is available and the forwarding plan is complete, an embodiment of the present disclosure can perform all necessary operations to support the data forwarding to the proper port or virtual port. These operations can include mapping and translating of the new addresses and ports, frame re-writing and modification (e.g., VLAN ID header, MAC addresses), frame encapsulation and so on.

An exemplary embodiment of the present disclosure may include a propagation mechanism of the relevant control information. The propagation mechanism can enable two or more L2FM to communicate efficiently and avoid data loop due to conflicting control rules, while maintaining their access to all devices. An exemplary propagation mechanism can be implemented using an appointed protocol, for example. An additional exemplary option can be to notify other devices by marking the manipulated frames using an agreed field or header, and so on.

The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific exemplary embodiments are described in detail to illustrate the inventive concepts to a person skilled in the art, such embodiments can be modified to various modifications and alternative forms. Accordingly, the figures and written description are not intended to limit the scope of the inventive concepts in any manner.

BRIEF DESCRIPTION OF THE SEVERAL
VIEWS OF THE DRAWING

Exemplary embodiments of the present disclosure will be understood and appreciated more fully from the following detailed description, taken in conjunction with the drawings in which.

DETAILED DESCRIPTION OF EXEMPLARY EMBODIMENTS

Turning now to the figures, in which exemplary embodiments of the present disclosure are described. For convenience, only some elements of the same group may be labeled with numerals. The purpose of the drawings is to describe exemplary embodiments and is not for production purpose. Therefore features shown in the figures were chosen only for convenience and clarity of presentation.

Figure 1:
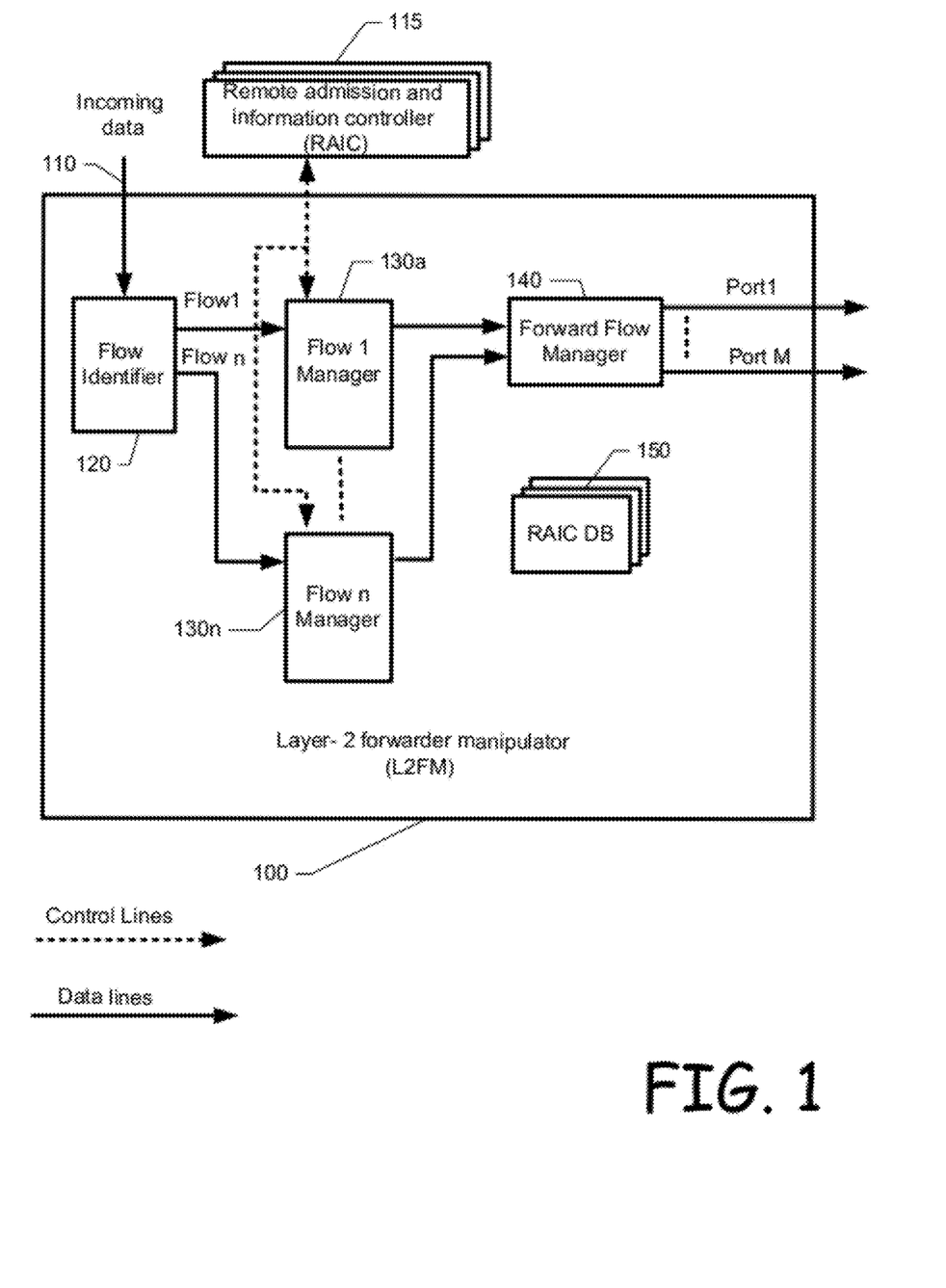
FIG. 1 depicts a block diagram with relevant elements of an exemplary Layer-2 Forwarder Manipulator (L2FM) according to an exemplary embodiment of the present disclosure.

FIG. 1 depicts a block diagram with relevant elements of an exemplary Layer-2 Forwarder Manipulator 100 (L2FM), according to an exemplary embodiment of the present disclosure. Layer-2 Forwarder Manipulator 100 (L2FM) can comprise: a flow identifier 120, one or more flow managers 130a-n, a forward flow manager 140 and a RAIC database 150.

At initiation, all resources relevant to the L2FM 100 can be allocated, reset, and\or introduced to each other. Resources such as, but not limited to: forward flow manager 140, session flow manager 130a-n, and so on. L2FM 100 can be updated with different parameters. Exemplary parameters can be: forwarding rules, traffic policies, priorities, etc.

Each ingress data frame is associated with a flow and a protocol. The flow identifier 120 can use connection information and protocol information regarding the data frame in order to determine the associated flow manager 130a-n for handling the data frame. The flow identifier module 120 can be responsible to identify each new incoming flow and its associated frames received via incoming connection 110, for example. For each incoming flow, a new line can be created in a flow table. The flow table can be used for efficiently identifying multiple flows of the same subscriber (network node), and/or multiple flows of the same application, and/or multiple flows of the same application session, for example. Exemplary information in a flow line can include addresses, ports, protocols and other information required to identify a frame belonging to this flow. In addition, flow line can include information regarding the relevant flow manager 130a-n (FIG. 1). Once a flow is terminated, the associated flow line can be removed from the table. A flow table can be implemented as a part of a forwarding rules table, or as a separate table.

The identification of a new flow and its associated frames might be quite complicated and might involve addresses and ports discovery, tunnel encapsulation striping, and some Deeper Packet Inspection operations, for example. However, in many cases it can be done simply and directly using a single dimension field such as destination IP address and destination port, for example. That is, the identification can be done by parsing of particular fields with constant offsets from the beginning of the frame, for example. In some cases a bit mask can be used for parsing of certain fields.

The flow manager 130a-n can process control information provided either solely by one or more Remote admission and information controller (RAIC) 115 or by additional sources such as admission control server, for example. In addition, the RAIC can instruct the flow manger 130a-n to communicate with another network entity, such as but not limited to a DPI helper or any other third party entity. The control information can be saved, by the flow manager 130a-n, in the RAIC database 150 for further use in additional flows. The flow manager modules 130a-n can be responsible for generating flows forward plan. The flow manager 130a-n can direct the flow frames to the forward flow manager 140 (FIG. 1) together with relevant control information. Relevant information can be desired port or virtual port (port 1 to port M), for example.

An authorized remote admission application can provide dynamic control information regarding the forward rules of its associated flows. For example, the forwarding rules can include re-writing instructions and/or assignment of its traffic into a specific private network (e.g., VLAN or MPLS), which its access can be controlled by the Remote admission and information controller (RAIC) 115. Exemplary remote admission applications can be, but are not limited to, Peer-to-Peer applications, specific video streaming services, and browsing services.

The Flow manager 130a-n (FIG. 1) can direct the flow frames to the Forward flow manager module 140 (FIG. 1) together with information of the forwarding and re-writing rules. Additional operations such as, but not limited to: Mapping and translating of the new addresses and ports may be performed as well.

In some embodiments the Flow manager 130a-n (FIG. 1) can generate a single forwarding plan to be used collectively for several different flows which use the same RAIC for example a RTSP session with associated RTP flows. Such information can be saved in the RAIC database 150.

The forward flow manager module 140 is responsible to perform all necessary operations to support the data forwarding to the proper port or virtual port (port 1 to port M). The forward flow manager module 140 is responsible to modify the flow frames according to the information in the flow forwarding rules line. Exemplary operations can be: possible modification of the flow frames, broadcast to Uni-cast, forcing a frame that leaves the L2FM to return to the L2FM, and SCTP (Stream Control Transmission Protocol) to TCP.

A special treatment can be given to tunneled traffic in the forwarding plan. The forwarder manager module 140 can either reconstruct tunneling encapsulation (such as PPPoE, L2TP or GRE) information of a specific originally tunneled flow or it can add selective new tunneling encapsulation information for the flow (regardless of the flow original tunnel). It can also choose to remove encapsulation all together and forwarded the traffic as non-encapsulated. Additional option is not to add any tunneling encapsulation information The forwarder flow manager 140 can handle multiple flows simultaneously. For each frame from a particular flow manager 130a-n, the forwarder flow manager 140 can modify the frame address/ports and direct the frame to the proper port or virtual port (port 1 to port M).

The forward flow manager 140, in certain cases, can forward the flow frames to the relevant port, using the standard MAC address discovery as done regularly on layer 2 forwarder. Exemplary cases can be: when the flow has no control information or insufficient control information.

For each frame, the forward flow manager 140 can use the flow table to verify whether the frame tunneling encapsulation should be reconstructed or not. If no tunneling encapsulation is needed, the frame can be transmitted toward the proper output ports (port 1 to port M); else, the tunneling encapsulation is added and the frame is transmitted afterward toward the proper output port.

The RAIC database 150 unit can be used for saving information and collecting statistics regarding multiple flows of a RAIC, for example. Additional examples are, counters of QoS of specific RAICs, information for RAICs accounting, etc. Each RAIC 150 can be associated with a RAIC 115.

An exemplary traffic forwarding done by L2FM 100 (FIG. 1) can be: forwarding traffic between anonymous peers in a P2P network. In common P2P networks hiding the peer's identity might be a valuable improvement for the peers. An exemplary embodiment of L2FM over a P2P network is disclosed below in conjunction with FIG. 5.

Figure 2:
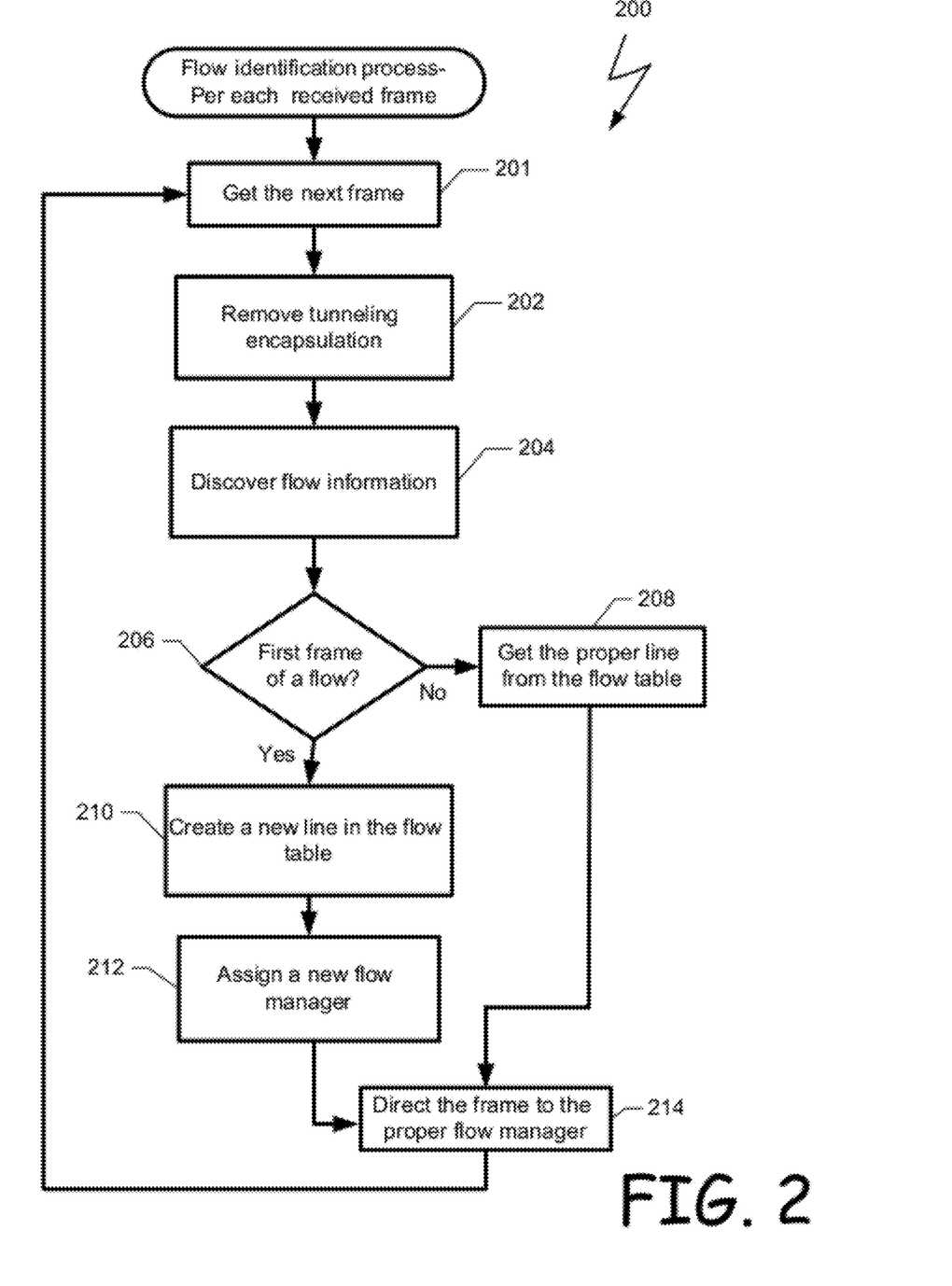
FIG. 2 illustrates a flowchart with relevant acts of an exemplary method for flow identification according to an exemplary embodiment of the present disclosure.

FIG. 2 illustrates a flowchart with relevant acts of an exemplary method 200 for flows identification per each received frame according to an exemplary embodiment of the present disclosure. Method 200 can be executed, per each received frame, by a flow identifier module 120 (FIG. 1), for example. At act 201a next frame is fetched to be processed. At act 202, tunneling encapsulation information (if exist) can be removed from the received frame. Tunneling might belong to PPP (Point to Point Protocol), PPPoE (Point to Point Protocol over Ethernet), for example. The tunneling encapsulation information can be saved as described below at act 210. The encapsulation information of the flow might be used when the flow forwarding plan include re-encapsulation.

At act 204, method 200 discovers flow information. Exemplary flow information can be discovered using layer 2 and/or layer 3 addresses, ports, some protocols information, and so on.

Next, a decision 206 needs to be made, whether the frame is the first frame of a flow. Method 200 can utilize the flow table in search of a matching line for the flow. If such line does not exist, then the frame is a first frame of a flow. If such line exists, the frame belongs to an ongoing flow.

If 206, the frame is not a first frame of a flow, then, at act 208 a suitable flow line can be retrieved from the flow table. And the frame with the retrieved data, or with a pointer to the flow line, can be directed 214 to the proper flow manager 130a-n (FIG. 1). If 206 the frame is the first frame of a flow, then method 200 proceeds to act 210.

Information about the flow identification that has been collected from the frame (including the tunneling encapsulation information if exists) and a new flow line is created 210 in the flow table storing the collected information.

Next a flow manager 130a-n (FIG. 1) can be assigned 212 to the new discovered flow and the frame can be directed 214 toward the proper flow manager 130a-n (FIG. 1) listed in the flow line and method 200 returns to act 201 for processing the next frame.

Figure 3:
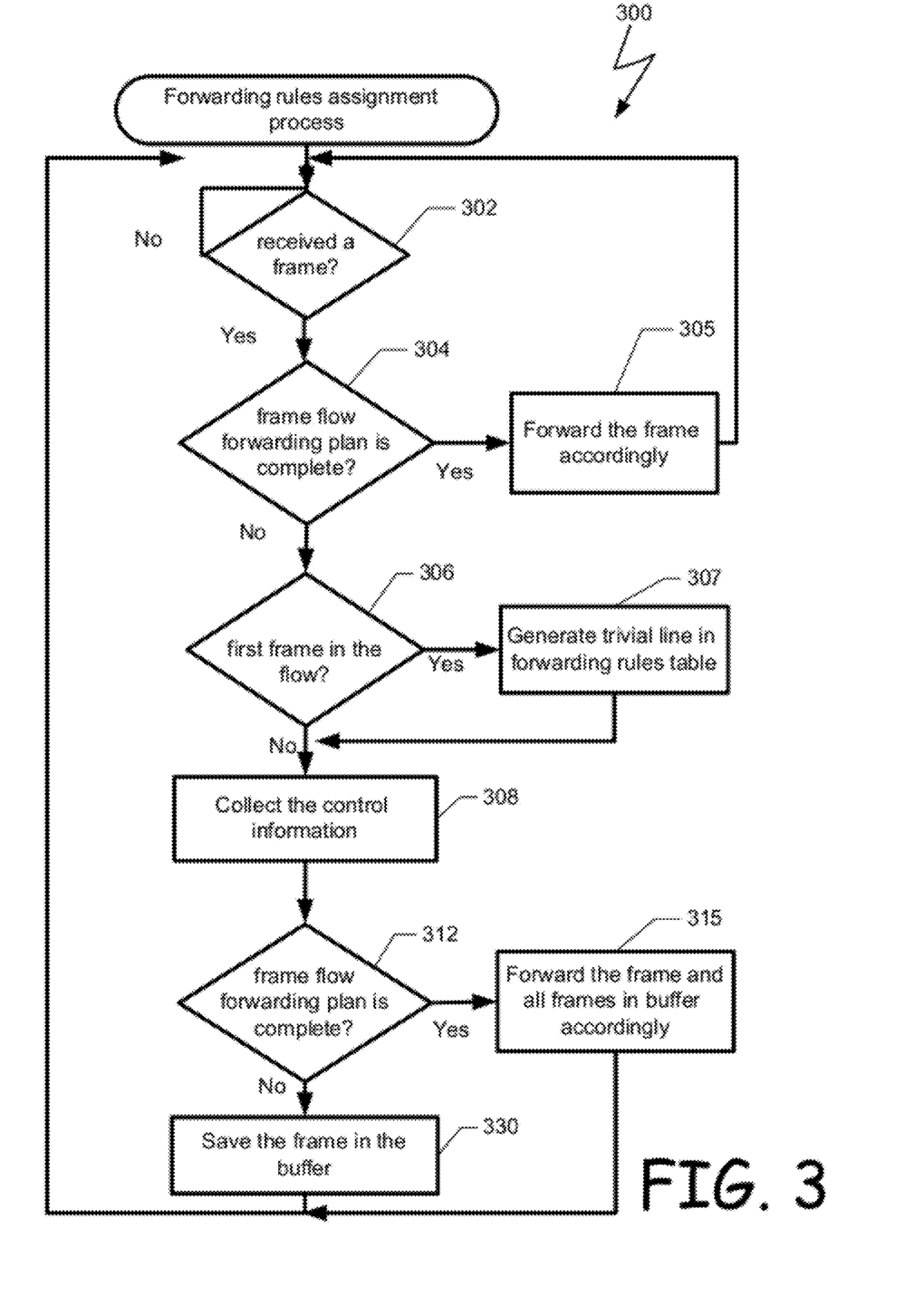
FIG. 3 illustrates a flowchart with relevant acts of an exemplary method for flow forwarding rules assignment according to an exemplary embodiment of the present disclosure.

FIG. 3 illustrates a flowchart with relevant acts of an exemplary method 300 for flow forwarding rules assignment according to an exemplary embodiment of the present disclosure. Method 300 can be executed by flow manager 130a-n (FIG. 1), for example. Method 300 can utilize the two above mentioned tables: a flow table and a forwarding rules table.

The forwarding plan of a flow should be determinate at the beginning of a flow, meaning upon the arrival of its first few frames. Once a frame is sent to the proper flow manger 130a-n (FIG. 1) by flow identifier 120 (FIG. 1), the flow manager 130a-n can start to process the frame. The first few frames of the flow can be used by the flow manager 130a-n to calculate the forwarding plan. Since the flow forwarding plan determinate the flow frame port or virtual port (port 1 to port M), all frames arriving to the flow manager while calculating the plan can be saved in a buffer till the completion of the flow forwarding plan. These first few frames receive different processing operations in comparison to the processing operations of the frames arriving after the completion of the flow forwarding plan as described in FIG. 3.

Upon a new frame arrival 302, the flow manager 130a-n can check if the forwarding plan of the flow is ready 304. If 304 the plan is ready, then the frame is forwarded 305 according to the information written in the forwarding rule table and process 300 returns to act 302. The matching between the frame information and the proper record in the forwarding rules table can be done in a single or in a multiple dimension manner.

If 304, the flow forwarding plan is not completed yet, the flow manager 130a-n can check if the frame is the first frame of the flow 306 and if so it can generate 307 a trivial line in the forwarding rules table according to the standard MAC address discovery as done regularly on layer 2 forwarder.

Then, the flow manager 130a-n can request and collect control information descriptor from the Remote admission and information controller (RAIC) 115 (FIG. 1) at act 308. If at act 306 the frame is not a first frame of a flow, then method 300 proceeds to act 308 to request and collect relevant control information. The control information descriptor can be pre-defined or received in-band or received out-of-band. An exemplary method for the control information collection is described in detailed in FIG. 4.

The application control information provided can help the flow manager 130a-n to complete the flow forwarding plan calculation. If 312 flow forwarding plan calculation is complete, then the frame together with all previous frames in buffer of the flow can be forwarded 315 toward the forward manager 140 (FIG. 1) and method 300 returns to act 302. If 312 the flow forwarding plan calculation is not ready yet, the frame can be saved 330 in its buffer and method 300 returns to act 302.

A flow control descriptor can be static and pre-defined in the forwarding table; or it can be embedded in the flow frames (using HTTP cookies headers or Ethernet tags, for example); or flow control descriptor might be passed using a specific control channel between the Remote admission and information controller (RAIC) 115 (FIG. 1) and the Flow manager 130a-n (FIG. 1). Additional control information may arrive from other network entities such as, but not limited: to Radius/Diameter server, AAA server, etc. The flow manager 130a-n (FIG. 1) can be responsibility to initiate a proper control channel to an appropriate RAIC 115. The flow manager 130a-n (FIG. 1) can determine when to search and request flow control information, and from whom to request it.

Figure 4:
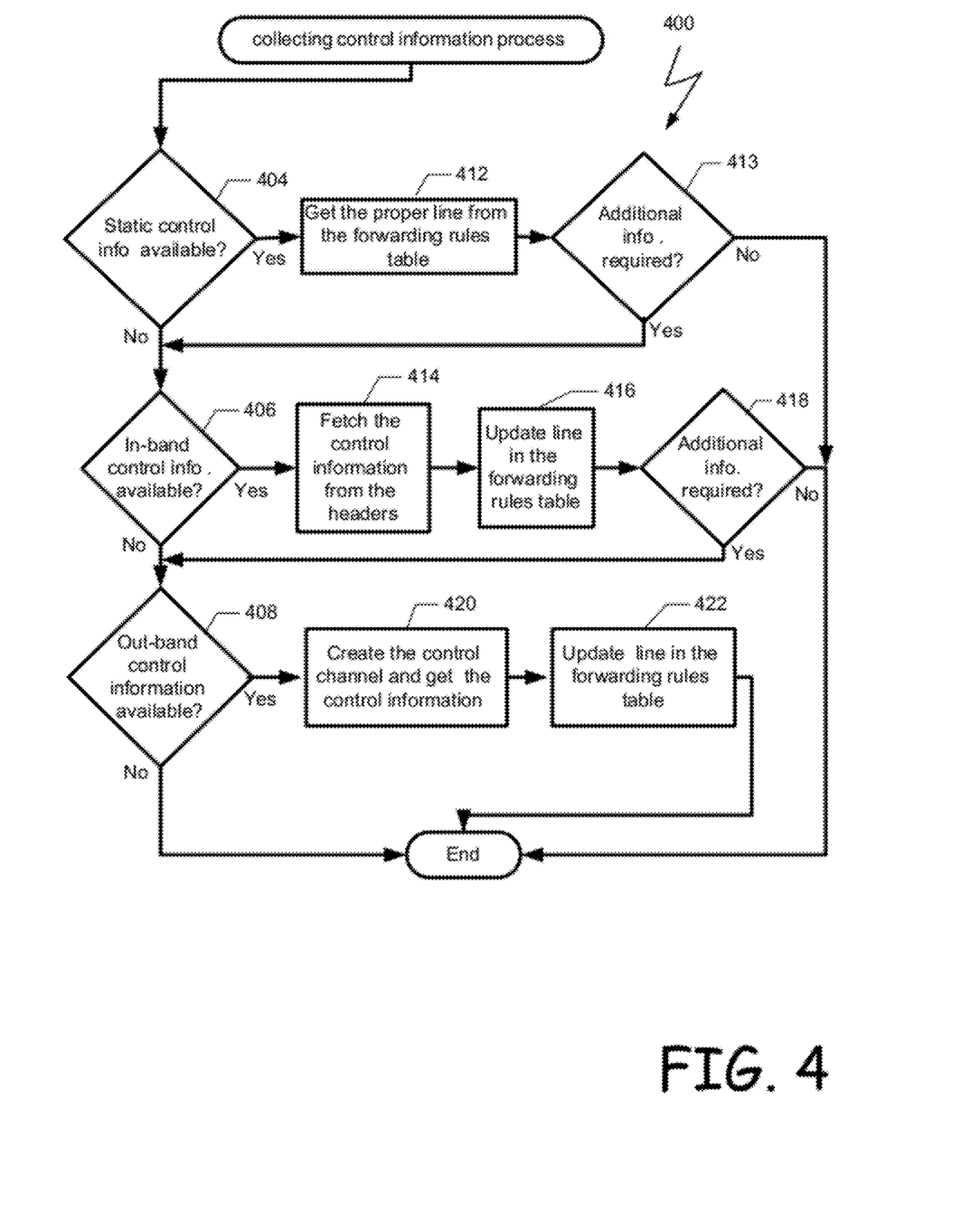
FIG. 4 illustrates a flowchart with relevant acts of an exemplary method for collecting the control information executed by a L2FM according to an exemplary embodiment of the present disclosure.

FIG. 4 illustrates a flowchart with a relevant process of an exemplary method 400. Method 400 can be executed by flow manager module 130a-n (FIG. 1), to collect control information required to prepare a forwarding plan. Exemplary method 400 can be executed at act 308 (FIG. 3).

At act 404 a decision is made, whether static pre-defined control information (forwarding information) regarding a flow is available in the forwarding rules table. An exemplary Flow manager 130a-n (FIG. 1) can use a static control scheme to pre-define specific forwarding rules. Such a scheme can be loaded from a relevant RAIC 115, for example. Such rules can apply to a particular subscriber (network node) set, to a particular destination address, and so on. For example: forward all traffic designated to address x.x.x.x to virtual port associated with VLAN "a". This type of control scheme/plan is the simplest one but it provides less flexibility. The flow manager 130a-n can search for relevant static control rules at the forwarding rules table, for example. The pre-defined control information can be stored in a single forwarding rules table serving all flow managers 130a-n or it can be distributed between the flow managers 130a-n according to session type/subscriber etc.

If 404 pre-defined information is available, then it is fetched 412 and method 400 proceeds to act 413. In act 413, the pre-defined forwarding rules information is processed and the method 400 checks if additional control information is required. Additional information such as user priority profile, for example. If 413 yes, then method 400 proceeds to act 406. If 413 not, then method 400 ends.

If 404 a static pre-defined control information regarding the flow is not available, then method 400 proceeds to act 406. Either the static pre-defined control information is not sufficient to perform the forwarding decision or there is no pre-defined control information for this flow. In both cases, the flow manager searches 406 for in-band control information according to the session type/protocol/subscriber.

If in-band control information is available 406, then method 400 fetches 414 the in-band control information and accordingly updates 416 the forwarding rules table. In-band control scheme can be used to define specific forwarding rule per flow. The control information can resides in one or more specific headers of the protocols used in the frame, the cookie header in HTTP protocol or the application extension header in RTSP/RTP, for example. The flow manager 130a-n can fetch the control information from the protocol headers of the frames and perform the forward decision accordingly. Once the forwarding rules have been determined, it can be stored in the forwarding rules table to reduce the processing time of the following data frames.

Next method 400 can check 418 if additional control information is required. If 418 yes, then method 400 proceeds to act 408. If 418 not, then method 400 ends.

Returning to act 406 if in-band control information is not available or any other control information is not sufficient, then method 400 proceeds to act 408. At act 408 method 400 can request and/or search for out-off-band control information according to the session, protocol or the network node. For example, information from a Peer to Peer (P2P) tracker regarding priority of a particular user (peer). In this case, the control information can be provided by the RAIC 115 (FIG. 1) through an appointed control protocol or through additional information from other network entities such as Radius server or AAA server. It is the flow manager responsibility to initiate the proper control channel to the RAIC 115 (FIG. 1) and to the other required network entities. For example, it should contain Radius client capabilities. The RAIC can instruct the flow manger 130a-n (FIG. 1) to communicate with another network entity, such as but not limited to a DPI helper or any other third party entity to receive additional control information.

If some out-off-band control information is available 408, then out-off-band control information channel is established 420 and control information is fetched. This channel can be defined by client/server relations (for example, Radius client/server) or by peers relations (for example, appointed control protocol), and so on. Next, the out-off-band control information is used to update the forwarding rules table 422 and method 400 ends.

In acts 416 and 422, the forwarding rules line is updated with the relevant information. This might include mapping and translating of the new addresses and ports, for example. In addition, special NAT (Network Address Translation) treatment such as multi-cast to uni-cast, broadcast to Uni-cast and SCTP (Stream Control Transmission Protocol) to TCP can be included. Note that additional processing such as ARP (Address Resolution Protocol) might be triggered here.

While collecting control information of a specific flow, the flow manager might reveal control information of additional associated flows. A simple example is a bi-directional TCP connection. Consider a TCP connection between a host "A" and a host "B". Once the flow manager assigned to handle the flow from host "A" to host "B" has completed its forwarding plan, at this point, it can usually generate the associated forwarding plan for the flow from host "B" to host "A" without additional control information. To optimize the present disclosure performance, the relevant forwarding rules for the flow from host "B" to host "A" can be inserted to the forwarding rules table too.

Figure 5:
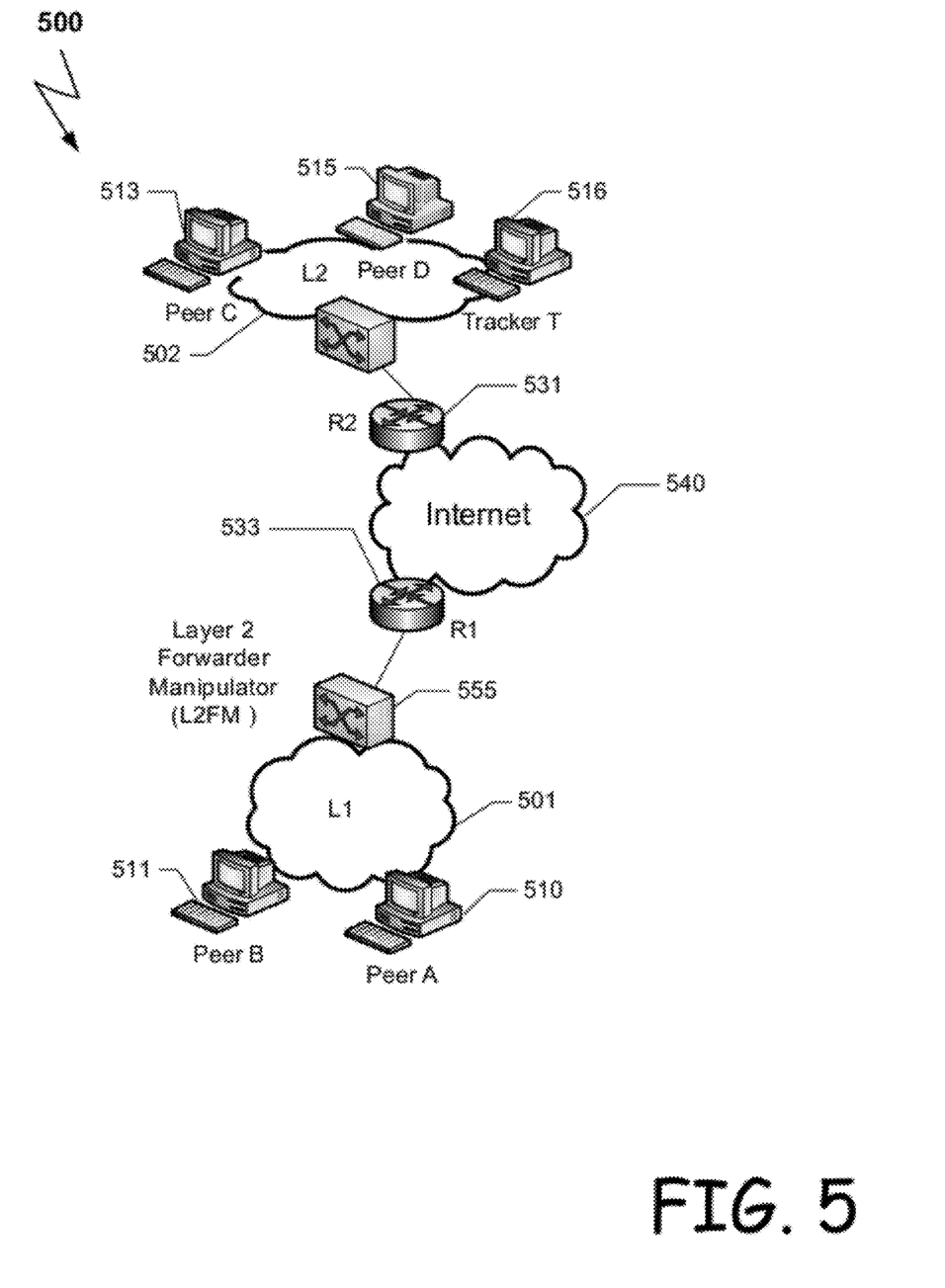
FIG. 5 is a simplified network diagram illustration of an exemplary portion of a common P2P network in which an exemplary embodiment of the present disclosure can be used.

FIG. 5 is a simplified network diagram 500 illustration of an exemplary portion of a common P2P network in which an exemplary embodiment of the present invention can be used. Exemplary P2P network can be a BitTorrent or an eDonkey, etc. over the Internet, for example. In a common P2P network, usually, if a peer member "A" 510 wishes to download a file X it relies on a tracker "T" 516 to find other peers and to find out what chunks of the file X they have. A few chunks of file X can be located in peers nearby "A", such as a peer "B" 511, for example. More chunks of file X can be located on far peers, such as a peer "C" 513 and a peer "D" 515 for example. In the exemplary network diagram 500 Peer C, Peer D, and tracker T are connected via local area network L2 502. Peer A, and Peer B are connected via local area network L1 501. Routers R1 533 and R2 531 connect LAN L1 and L2 via a Internet 540, for example. The L2FM 555 can be implemented as a local network L1 501 switch.

Some peers might not want to reveal their identity to some other peers in the network. A novel efficient solution to this privacy problem can be easily implemented with the L2FM. Let assume that the peers in our example wish to keep their privacy and each peer reveal its identity to tracker "T" 516 only. A simple but not efficient solution to the peer privacy problem is to always transfer the chunks via the tracker "T" 516. Consequently in a prior art situation a packet from peer "B" 511 to peer "A" 510 has to go all the way to tracker "T" 516 via a common switch, which would be placed in the location of L2FM 555, router R1 533, the Internet 540, router R2 531 and back al the way to network 501 and to peer "A" 510. An exemplary embodiment of the present invention can be used to improve the efficiency of this solution as it is disclosed below.

Figure 6:
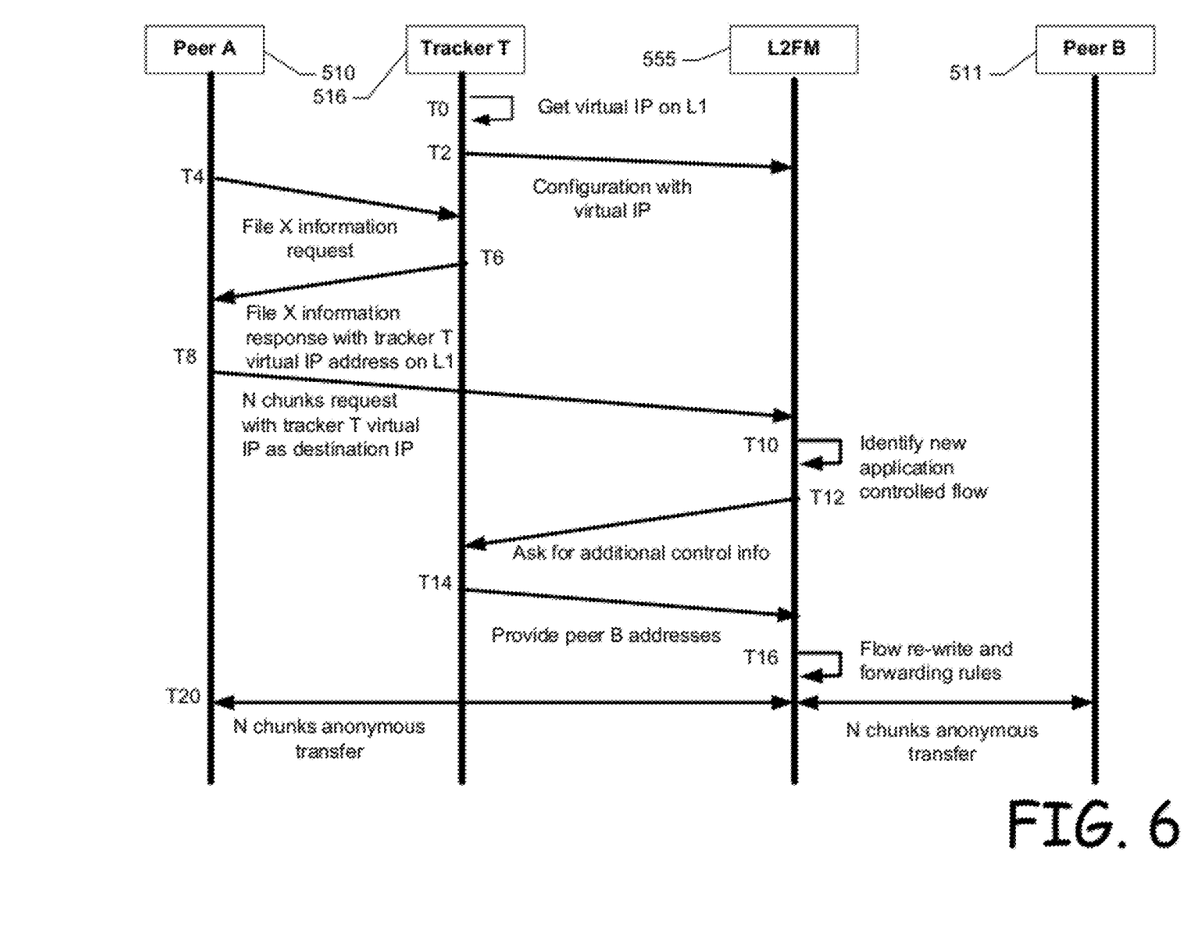
FIG. 6 illustrates a time diagram of an exemplary embodiment of the present disclosure used to solve an anonymous P2P traffic problem.

Details on exemplary solution for handling data flow of the anonymous P2P traffic transfer is described in FIG. 6. FIG. 6 illustrates a time diagram having four axes: Peer "A" 510, Tracker "T" 516, L2FM 555 and Peer "B" 511. It should be noted that the axes are drawn for illustration only. The time axes are not in scale and equal segments along the time scale may not represent equal time intervals. At T0 in order to benefit from the advantages of an exemplary L2FM 555 an exemplary admission control server such as tracker "T" 516, which is adapted to act according to the present disclosure, can contact the network administrator of network L1 501 (FIG. 5), to receive a virtual IP address in network L1 501

(FIG. 5). In addition, the admission control server tracker "T" 516 can configure at T2 L2FM 555, to identify flows with destination IP equal to tracker "T" virtual IP in L 1501 (FIG. 5). In the example of FIG. 5 tracker "T" 516 acts as an exemplary RAIC 115 (FIG. 1)

At time T4, peer "A" 510 can submit a request for information on file X to tracker "T" 516, using the public IP address of the "T". Then, tracker "T" 516 can response T6 with the information on the file X with its virtual IP address on network L1 501 (FIG. 5). As a result, peer "A" 510 can generate T8 a request for N chucks on network L1 501 (FIG. 5) using the virtual IP address of tracker "T". The request can arrive to L2FM 555. Next, L2FM 555 can identify T10 this flow as a new flow and can create a new line in the flow table. Since the tracker application 516 configured the L2FM 555 to identify such flow (that is, a flow with its virtual IP as destination IP) as its controlled flow, a flow that can be forward by the tracker and L2FM toward an optimal path, then L2FM 555 can collect and or request additional control information. L2FM 555 can create T12 a proper control channel with the tracker "T" 516. On this control channel L2FM 555 can ask tracker "T" 516 for additional required control information. At time T14 tracker "T" 516 can response with the addresses of peer "B" 511, for example.

Using the tracker "T" control information regarding the addresses of peer "B" 511, the relevant flow manager 130 (FIG. 1) can update T16 the flow table and can set the exact re-writing and forwarding rules for this flow. Exemplary rules are described in details below. Then, flow manager 130 (FIG. 1) can direct all flow frames arrived so far (and saved in a buffer) to the forward flow manager 140 (FIG. 1). At time T20, the forward flow manager 140 can finally anonymously transmit the frames between to the proper ports, the port of peer "A" and the port of peer "B". Note that L2FM 555 can identify the associated flow from peer "B" 511 (FIG. 5) to peer "A" 510 and can set the re-writing and forwarding rules to hide their identity in this direction as well at the same time without requesting additional control information from the tracker "T" 516 (FIG. 5) that act as RAIC 115 (FIG. 1).

Figure 7:
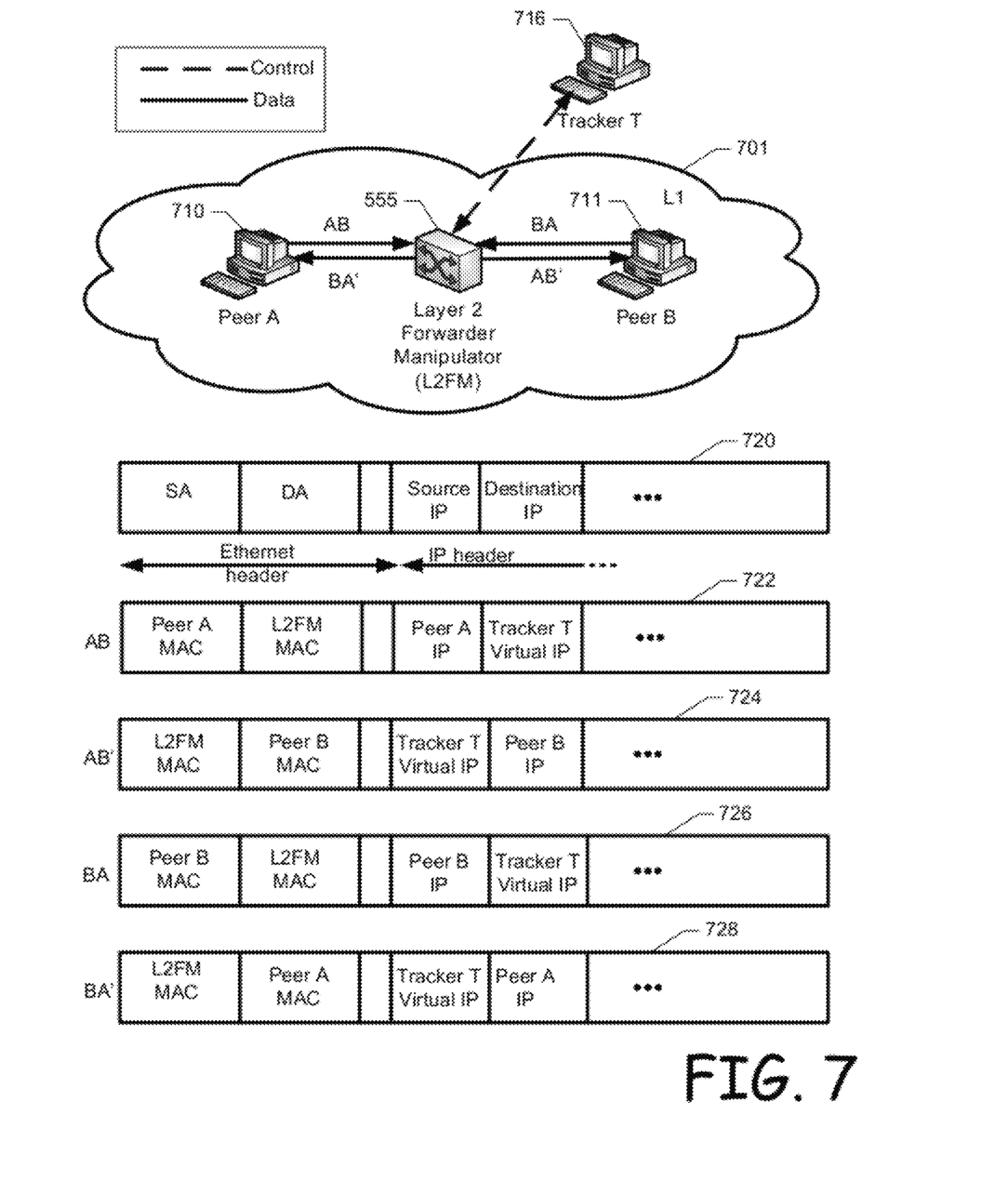
FIG. 7 illustrates exemplary re-writing changes which can be executed by an exemplary embodiment of the present disclosure.

FIG. 7 illustrates results of exemplary re-writing and forwarding rules in modifying the headers in this P2P anonymous traffic session. For the simplicity of the example frame 720 uses Ethernet as OSI layer-2 protocol and IP as OSI layer-3 protocol. Consider a flow AB of frames 722 in the direction from peer "A" 710 to a virtual address of a tracker T 716 on a network L1 701. As presented in FIG. 7, the frames 722 in flow AB include an Ethernet header with the values of peer "A" 710 MAC address as Source Address (SA) and the L2FM 555 MAC address as the Destination Address (DA). In addition, the IP addresses are the peer "A" 710 IP (source) and the virtual IP address of the tracker "T" (destination). To keep peer "A" anonymous to peer "B". The headers re-writing instructions can include the following: replacing the SA of peer "A" 710 with the MAC address of the L2FM 555; replacing the DA of the L2FM 555 with the MAC address of peer "B" 711. Replacing the source IP address of peer "A" 710 with the virtual address of the tracker "T" on the network L1 701; replacing the destination IP address of the virtual address of the tracker "T" with the IP address of peer "B" 511. The result a flow of frames 724 AB' from L2FM 555 to peer "B" 711. The forwarding rules of flow AB' can be: to direct this flow to the port associated with the MAC address of peer "B" 711.

Now, consider a flow BA of frames 726 in the direction from the peer "B" 711 to the virtual address of the tracker "T" on the network L1 701. The frames 726 include an Ethernet header with the values of peer "B" 711 MAC address as Source Address (SA) and the L2FM 555 MAC address as the Destination Address (DA). In addition, the IP addresses are the peer "B" 711 IP (source) and the virtual IP address of the tracker "T" (destination). To keep peer "B" anonymous to peer "A", the headers re-writing rules can change BA to BA' by: replacing the SA of the peer "B" 711 with the MAC address of the L2FM 555; replacing the DA of the L2FM 555 with the MAC address of peer "A" 710; replacing the source IP address of peer "B" 711 with the virtual address of the tracker "T" on network L1 701; replacing the destination IP address of the virtual address of the tracker "T" with the IP address of peer "A" 710 as illustrated by frame 728. The forwarding rules of flow BA' can be to direct this flow to the port associated with the MAC address of peer "A" 710.

The collection of devices such as Layer-2 Forwarder Manipulator (or other layer-2 forwarders) can be considered as a network graph whose nodes are the devices and whose edges (connections) are the cables connecting the devices. To break loops in the graph while maintaining access to all graph segments, the devices collectively can compute a spanning tree similar to other switches implementation. The spanning tree is not necessarily a minimum cost spanning tree. A network administrator can reduce the cost of a spanning tree, if necessary, by altering some of the configuration parameters (such as device ID) in such a way as to affect the choice of the root of the spanning tree.

The devices need to have topologies with one active path between two points to avoid loops. The older IEEE 802.1 D spanning tree protocol could be used but it is quite slow, with forwarding stopping for 30 90 seconds while the spanning tree would re-converge. A Rapid Spanning Tree Protocol was introduced as IEEE 802.1w and can be used as well.

In the description and claims of the present disclosure, each of the verbs, 'comprise', 'include' and 'have', and conjugates thereof, are used to indicate that the object or objects of the verb are not necessarily a complete listing of members, components, elements, or parts of the subject or subjects of the verb.

In this disclosure the words 'module', 'unit', and 'device' are used interchangeably. Anything designated as a module, unit, or device may be a stand-alone unit or a specialized module. A module, unit, or a device may be modular or have modular aspects allowing it to be easily removed and replaced with another similar module or device. Each module, or unit or device may be any one of, or any combination of, software, hardware, and/or firmware. Exemplary HW components can be such as but not limited to ASIC based NPU and FPGA based NPU. Software of a logical module can be embodied on a computer readable medium such as a read/write hard disc, CDROM, Flash memory, ROM, etc. In order to execute a certain task a software program can be loaded to an appropriate processor as needed.

The present disclosure has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Many other ramification and variations are possible within the teaching of the embodiments comprising different combinations of features noted in the described embodiments.

It will be appreciated by persons skilled in the art that the present invention is not limited by what has been particularly shown and described herein above. Rather the scope of the invention is defined by the following claims.

What is claimed is:

1. A layer 2 forwarder and manipulator (L2FM) located in a layer 2 network and serves a plurality of networks entities, the L2FM comprising:
a flow identifier;
one or more flow managers; and
a forward-flow manager;
wherein the flow identifier receives a plurality of frames, from a plurality of entities, identifies one or more flows and accordingly, associates a flow to a flow manager out of the one or more flow managers and forwards the flow frames to the associated flow manager;
wherein per each new flow the flow manager, obtains forwarding control information for the new flow from a remote-admission-and-information controller (RAIC) and based on the obtained information, defines rules for forwarding the flow frames, and assigns the forwarding rules and the flow frames to the forward-flow manager, wherein the flow manager, based on the received frame of the flow, obtains the forwarding control information by selecting the RAIC from one or more different RAICs and the RAIC is an external entity to the network served by the L2FM; and
wherein the forward-flow manager, handles the flow frames and forwards the flow frames to an appropriate port based on the forwarding rules.

2. The L2FM of claim 1, wherein at least part of the forwarding-control information is obtained from the selected RAIC after transferring one or more frames of the new flow toward the selected RAIC.

3. The L2FM of claim 1, wherein the RAIC can instruct the L2FM to transfer one or more frames of the new flow toward another entity for further analysis.

4. The L2FM of claim 1, wherein the L2FM send instruction data to another RAIC.

5. The L2FM of claim 1, wherein the communication with the RAIC is done out of band.

6. The L2FM of claim 1 wherein at least part of the forwarding-control information is embedded in the frames of the flow.

7. L2FM of claim 1, wherein the selected RAIC is a virtual member in the Layer 2 network.

8. The L2FM of claim 1, wherein at least portion of the forwarding control information is embedded in-band.

9. The L2FM of claim 1, wherein the forwarding rules comprises re-writing one or more fields in one more of the original headers of at least one of the flow frames.

10. The L2FM of claim 9, wherein re-writing further comprising manipulating the encapsulation casing of the flow.

11. The L2FM of claim 9, wherein the RAIC can instruct the L2FM to copy a frame to plurality of addresses.

12. The L2FM of claim 9, wherein re-writing can manipulate uni-cast frames to multicast or broadcast frames and vice versa.

13. The L2FM of claim 11, wherein re-writing comprise converting SCTP frames to TCP frames and vice versa.

14. The L2FM of claim 11, wherein the copy of a frame is done across different virtual networks.

15. The L2FM of claim 12, wherein manipulating uni-cast frames to multicast frames is done across different virtual networks.

16. The L2FM of claim 13 wherein newly created TCP flows can access different virtual interfaces.

17. The L2FM of claim 9, wherein the one or more fields in the original header are associated with the RAIC.

18. The L2FM of claim 9, wherein the original header is a header that was associated to the frame at the host that created the frame.

19. The L2FM of claim 9, wherein the layer 2 network is based on a Ethernet protocol, the layer 3 is based on Internet Protocol, the flow is Peer-to-Peer flow between a user "A" and a user "B" of the layer 2 network and the RAIC is a Tracker server having virtual address; then the re-writing one or more fields at the headers within frames received from user "A" and targeted toward the virtual address of the Tracker server further comprising replacing the destination IP address of the Tracker address with the IP address of peer 'B', and replacing the Source IP address of peer 'A' with the virtual address of the Tracker server.

20. The L2FM of claim 17, wherein the forward flow manager manipulated the addresses at the headers within frames received from user "B" and targeted toward the address of the tracker server by re-writing the source IP address of the packet received from user "B" as the address of the Tracker server and the destination IP address as the IP address of user "A".

21. The L2FM of claim 19, wherein the re-writing further comprising replacing the destination MAC address of the L2FM with the MAC address of peer 'A', and replacing the source MAC address of peer 'B' with the MAC address of the L2FM.

22. The L2FM of claim 1, wherein the RAIC registers at an administrator of the layer 2 network and gets a virtual address; configures the L2FM to transfer a first frame, of a new flow, in which the destination address of the first frame is the virtual address, toward the RAIC in order to get forwarding control information; sends to the L2FM re-writing instruction of the frames and encapsulated header of the flow.

23. The L2FM of claim 1, wherein the RAIC is a network device selected from a group consisting of admission control server and application control server.

24. The L2FM of claim 23, wherein the application control server is a server selected from a group consisting of: Peer-to-Peer application servers, video streaming servers, and Web servers.

25. The L2FM of claim 1, wherein each RAIC has an account at the L2FM and the accounting information is calculated for the RAIC.

26. A method for forwarding frames of a flow via a layer 2 forwarder and manipulator (L2FM), the method comprising:
a. identifying, at the L2FM, one or more first frames of a new flow;
b. obtaining forward control information for frames of the new flow, wherein the forward control information includes re-writing of at least one field in an original header of the frames of the new flow, wherein obtaining forward control information is done out of band;
c. changing the at least one field in an original header of the frames of the new flow according to the obtained forward control information; and
d. forwarding the frames of the new flow according to the forward control information;
wherein at least portion of the control information is obtained from a remote-admission-and-information controller (RAIC).

27. The method of claim 26, wherein obtaining forward control information is done by sending the one or more first frames toward the RAIC.

28. The method of claim 26, wherein the original header is a header that was associated to the frame at the host that created the frame.

29. The method of claim 26, wherein at least portion of the control information is embedded in-band.

30. The method of claim 26, wherein one or more of the fields in the original headers is associated with the RAIC.

31. The method of claim 26, wherein forwarding the flow frames according to the forward control information further comprising re-writing the IP header of the original frame by re-writing the virtual address of the RAIC as the source IP address of the flow frames instead of the destination IP address.

32. The method of claim 26, wherein the RAIC is a network device selected from a group consisting of admission control server and application control server.

33. The method of claim 32, wherein the application control server is a server selected from a group consisting of: Peer-to-Peer application servers, video streaming servers, and Web servers.

34. The method of claim 26, wherein the RAIC can instruct the L2FM to transfer one or more frames of the new flow toward another entity for further analysis.

35. The method of claim 26, wherein re-writing further comprising manipulating the encapsulation casing of the flow.

36. The method of claim 26, wherein the RAIC instructs the L2FM to copy a frame to plurality of addresses 37. The method of claim 26, wherein re-writing can manipulate uni-cast frames to multicast or broadcast frames and vice versa.

38. The method of claim 26, wherein copy a frame is done across different virtual networks.

39. The method of claim 26, wherein manipulating uni-cast frames to multicast frames is done across different virtual networks.

40. A layer 2 forwarder and manipulator (L2FM) located in a layer 2 network and serves a plurality of networks entities, the L2FM comprising:
   a flow identifier;
   one or more flow managers; and
   a forward-flow manager;
   wherein the flow identifier receives a plurality of frames, from a plurality of entities, identifies one or more flows and accordingly, associates a flow to a flow manager out of the one or more flow managers and forwards the flow frames to the associated flow manager;
   wherein per each new flow the flow manager, obtains forwarding control information for the new flow from a remote-admission-and-information controller (RAIC) and based on the obtained information, defines rules for forwarding the flow frames, and assigns the forwarding rules and the flow frames to the forward-flow manager, wherein the flow manager, based on the received frame of the flow, obtains the forwarding control information by selecting the RAIC from one or more different RAICs and wherein at least part of the forwarding-control information is obtained from the selected RAIC after transferring one or more frames of the new flow toward the selected RAIC; and
   wherein the forward-flow manager, handles the flow frames and forwards the flow frames to an appropriate port based on the forwarding rules.

41. A layer 2 forwarder and manipulator (L2FM) located in a layer 2 network and serves a plurality of networks entities, the L2FM comprising:
   a flow identifier;
   one or more flow managers; and
   a forward-flow manager;
   wherein the flow identifier receives a plurality of frames, from a plurality of entities, identifies one or more flows and accordingly, associates a flow to a flow manager out of the one or more flow managers and forwards the flow frames to the associated flow manager;
   wherein per each new flow the flow manager, obtains forwarding control information for the new flow from a remote-admission-and-information controller (RAIC) and based on the obtained information, defines rules for forwarding the flow frames, and assigns the forwarding rules and the flow frames to the forward-flow manager, wherein the flow manager, based on the received frame of the flow, obtains the forwarding control information by selecting the RAIC from one or more different RAICs and the RAIC can instruct the L2FM to transfer one or more frames of the new flow toward another entity for further analysis; and
   wherein the forward-flow manager, handles the flow frames and forwards the flow frames to an appropriate port based on the forwarding rules.

42. A layer 2 forwarder and manipulator (L2FM) located in a layer 2 network and serves a plurality of networks entities, the L2FM comprising:
   a flow identifier;
   one or more flow managers; and
   a forward-flow manager;
   wherein the flow identifier receives a plurality of frames, from a plurality of entities, identifies one or more flows and accordingly, associates a flow to a flow manager out of the one or more flow managers and forwards the flow frames to the associated flow manager;
   wherein per each new flow the flow manager, obtains forwarding control information for the new flow from a remote-admission-and-information controller (RAIC) and based on the obtained information, defines rules for forwarding the flow frames, and assigns the forwarding rules and the flow frames to the forward-flow manager, wherein the flow manager, based on the received frame of the flow, obtains the forwarding control information by selecting the RAIC from one or more different RAICs and the L2FM send instruction data to another RAIC; and
   wherein the forward-flow manager, handles the flow frames and forwards the flow frames to an appropriate port based on the forwarding rules.

\* \* \* \* \*